United States Patent [19]
Shimizu

[11] 3,795,228
[45] Mar. 5, 1974

[54] NOZZLE FOR ROTARY PISTON ENGINE

[75] Inventor: Hiroshi Shimizu, Hiroshima, Japan

[73] Assignee: Toyo Kogyo Company Limited, Hiroshima, Japan

[22] Filed: Dec. 22, 1971

[21] Appl. No.: 210,949

[30] Foreign Application Priority Data
Dec. 22, 1970   Japan............................ 45-130358
Dec. 22, 1970   Japan............................ 45-130359
Dec. 23, 1970   Japan............................ 45-130348
Dec. 23, 1970   Japan............................ 45-130349

[52] U.S. Cl................................. 123/8.01, 123/8.45
[51] Int. Cl............................................... F02b 53/00
[58] Field of Search .... 123/8.01, 8.13, 8.45, 119 A, 123/8.07

[56] References Cited
UNITED STATES PATENTS

| | | | |
|---|---|---|---|
| 3,476,092 | 11/1969 | Yamamoto | 123/8.07 |
| 3,097,632 | 7/1963 | Froede et al | 123/8.45 X |
| 3,168,078 | 2/1965 | Camm | 123/8.13 |
| 3,546,878 | 12/1970 | Yoshimura | 123/8.45 X |
| 3,464,394 | 9/1969 | Satoh | 123/8.45 |
| 3,265,046 | 8/1966 | Paschke | 123/8.13 |

*Primary Examiner*—Carlton R. Croyle
*Assistant Examiner*—Michael Koczo, Jr.
*Attorney, Agent, or Firm*—Sughrue, Rothwell, Mion, Zinn & Macpeak

[57] ABSTRACT

In a rotary piston engine, there is provided a system for purifying the exhaust gas to reduce NOx (nitrogen oxide) in the exhaust gas by recirculating the exhaust or combustion gas into an intake mixture or a system for purifying the exhaust gas to reduce unburned components such as CO, HC, etc. in the exhaust gas by supplying secondary air to the exhaust or combustion gas, and an outlet nozzle for the combustion gas or a supply nozzle for secondary air are adapted to open in the exhausting stroke chamber. Means are provided for preventing sludge from accumulating upon or adhering to the nozzles.

20 Claims, 21 Drawing Figures

3,795,228

NOZZLE FOR ROTARY PISTON ENGINE

BACKGROUND OF THE INVENTION

This invention relates to improvements in the structure of a nozzle adapted to open in an exhausting stroke chamber of a rotary piston engine.

Heretofore, there have been used means for reburning unburned components such as CO, HC, etc. contained in the exhaust gas by supplying secondary air for purifying the exhaust gas in an internal combustion engine, and in this method, since the unburned gas is reburned by the heat energy of the exhaust gas itself, it is known that the higher the temperature of the exhaust gas at the position where the secondary air is supplied, the more effective oxidizing reaction is developed.

Therefore, in case of a rotary piston engine, it is preferable that the supplying position of the secondary air is provided in the combustion or exhausting stroke chamber in which the temperature of the exhaust gas is highest. The supplying position may be selected as being on the center housing or side housing forming the exhausting stroke chamber. However, if a supply nozzle for the secondary air is merely opened on the inner surface of the center or side housing, the nozzle will become loaded with sludge since the seal is slidably in contact with the inner surface of the housing. Therefore, the nozzle becomes clogged and the secondary air cannot be supplied in an extremely short time period. Accordingly, such a secondary air supplying device has not yet been put into practical use in a rotary piston engine.

In order to remove NOx (nitrogen oxide) contained in the exhaust gas exhausted from the engine, it is known that part of combustion gas is recirculated into the intake mixture to reduce the combustion efficiency of the engine. When such an exhaust gas recirculating system is applied to the rotary piston engine, the outlet nozzle of the combustion gas can be opened in the exhausting stroke chamber. However, if the exhaust nozzle is opened merely on the center or side housing forming the exhausting stroke chamber, the nozzle will become loaded with sludge in a short time period similarly to the case of the secondary air supply nozzle as hereinbefore described.

SUMMARY OF THE INVENTION

It is one object of the present invention to provide a nozzle structure adapted to open in an exhausting stroke chamber of a rotary piston engine which will not become loaded with sludge for a long period of time.

It is another object of the present invention to provide a nozzle structure adapted to open in an exhaust stroke chamber of a rotary piston engine which may have means for preventing loading with sludge, and may be adapted to supply secondary air or remove part of the exhaust gas.

It is a further object of the present invention to provide a nozzle structure adapted to open in an exhaust stroke chamber of a rotary piston engine which has means for removing sludge adhered thereto or preventing an accumulation of sludge, by utilizing the pressure difference between the adjacent chambers.

It is still another object of the present invention to provide a nozzle structure adapted to open in an exhaust stroke chamber of a rotary piston which prevents sludge from adhering thereto by providing at the opening of the nozzle a floating member moved by the pressure in the chamber.

BRIEF DESCRIPTION OF THE DRAWINGS

These and other objects, features and advantages of the present invention will become apparent from the following description taken in conjunction with the accompanying drawings, in which.

DESCRIPTION OF THE PREFERRED EMBODIMENTS

Figure 1:
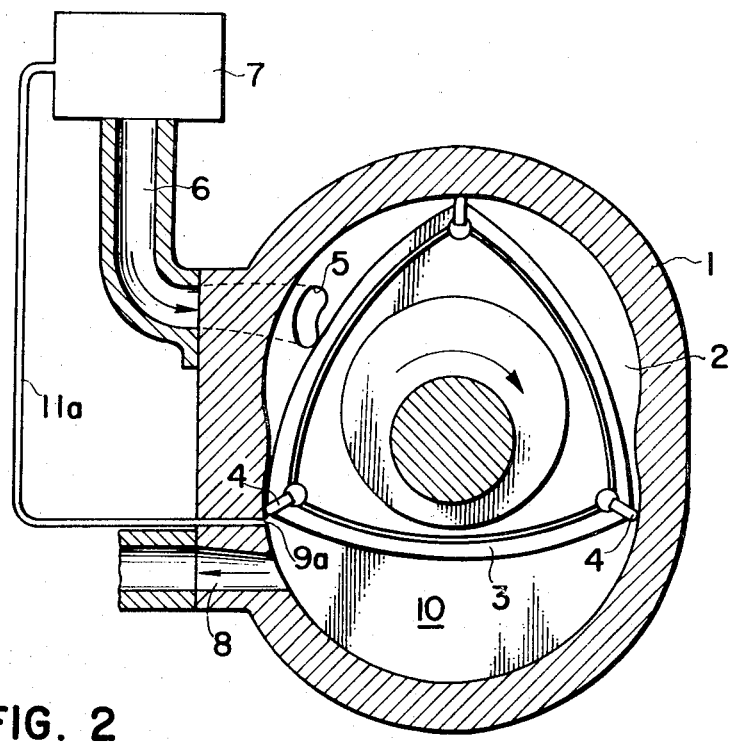
FIG. 1 is a front elevational view in section of one example of a rotary piston engine having an exhaust gas recirculating system with the nozzle structure according to this invention.

In the drawings, the same reference numerals illustrate the same parts.

In FIG. 1, which shows one example of a rotary piston engine having an exhaust gas recirculating system with a nozzle structure according to the present invention, reference numeral 1 illustrates a center housing having a trochoidal inner peripheral surface, 2 denotes side housings disposed at both sides of the center housing 1, 3 identifies a rotary piston moving in planetary motion in a casing composed of the center housing 1 and the side housings 2. The numerals 4 indicate apex seals mounted to the respective apexes of the rotary piston in sliding contact with the inner peripheral surface of the housing. The numeral 5 is an intake port opening in the housing such as, for example, in the side housing 2, which is connected with a carburetor 7 through an intake passage 6. The numeral 8 identifies an exhaust port provided in the center housing. 9a is an outlet port or nozzle for combustion gas opening on the inner surface of the housing such as, for example, the center housing 1 forming an exhausting stroke chamber 10 and connected through a conduit 11a to the carburetor 7. Thus, in operation of the engine, the combustion gas in the exhausting stroke chamber 10 is mixed through the nozzle 9a, the conduit 11a and the carburetor 7 with the mixture in the intake gas passage 6 so as to be recirculated, thereby reducing the combustion efficiency of the mixture so as to prevent NOx from being generated in large quantities.

Figure 2:
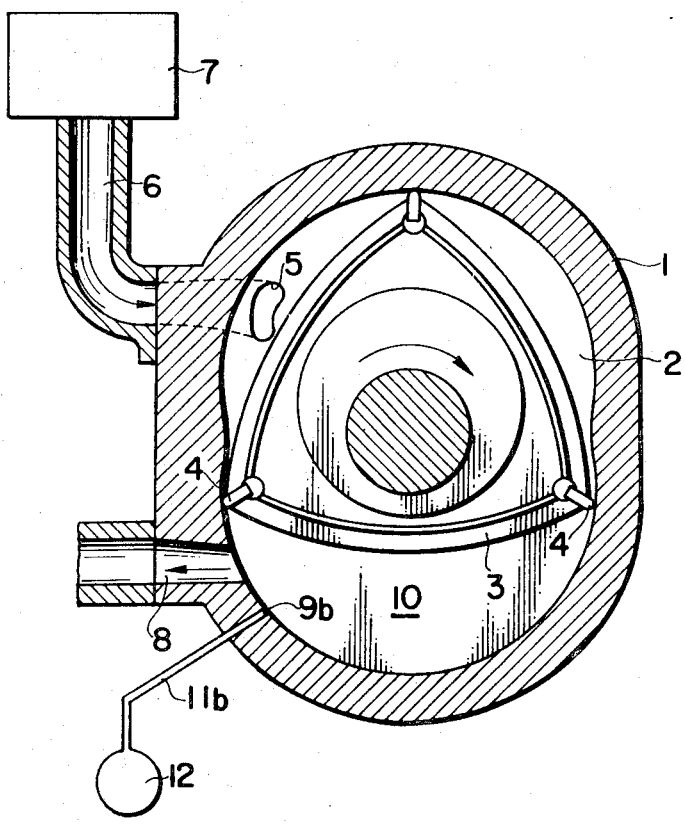
FIG. 2 is a front elevational view in section of one example of a rotary piston engine having a secondary air supply system with the nozzle structure according to this invention.

FIG. 2 shows a rotary piston engine having a secondary air supply system instead of the exhaust gas recirculating system in the same type of rotary piston engine as shown in FIG. 1. That is, a secondary air supply port or nozzle 9b opens into the inner surface of the housing such as, for example, the center housing 1 forming the exhausting stroke chamber 10, and is connected to an air pump 12 through a conduit 11b. Thus, the secondary air is supplied into the exhaustng stroke chamber 10 in order to burn so as to remove unburned detrimental components such as CO, HC, etc. in the combustion gas.

The nozzles opening in the exhausting stroke chamber, such as outlet nozzle for the combustion gas of the exhaust gas recirculating system shown in FIG. 1, or the secondary air supply nozzle of the secondary air supply system illustrated in FIG. 2 have means for preventing an accumulation of sludge thereon.

The embodiments shown in FIGS. 3 to 7 serve to automatically remove the sludge accumulating on the nozzles by utilizing the pressure difference between the adjacent two operating chambers such as, for example, between the expanding stroke chamber and the exhausting stroke chamber, or between the exhausting stroke chamber and the intake stroke chamber.

Figure 3:
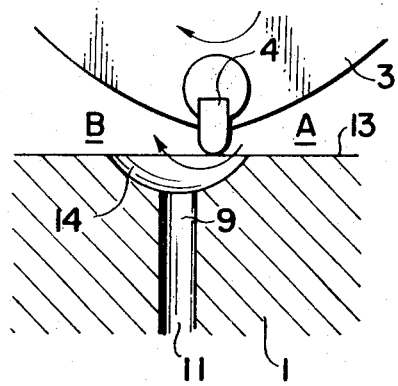
FIG. 3 is an enlarged sectional view of the nozzle portion opened in an exhausting stroke chamber of the rotary piston engine shown in FIG. 1 or 2.

In FIG. 3, which shows the nozzle portion opening in the exhausting stroke chamber of the rotary piston engine shown in FIG. 1 or 2, a recess 14 of concave shape is provided on the seal sliding surface 13 of the center housing 1, and the nozzle 9 opens into the recess 14. Therefore, if the apex seal 4 of the piston 3 rotating in the direction as designated by the arrow reaches the recess 14 of the seal sliding surface 13, the high pressure of the high pressure operating chamber A passes through the gap formed around the apex seal 4 by the recess 14 and discharges abruptly into the low pressure operating chamber B so that any sludge tending to be accumulated near the opening of the nozzle 9 is removed by the discharging force of the high pressure gas. Accordingly, the loading of the nozzle opening with sludge may be positively prevented.

Figure 4:
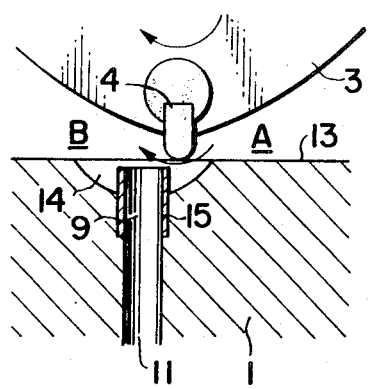
FIGS. 4 to 7 are expanded sectional views similar to FIG. 3 showing other embodiments of the present invention.
Figure 5:
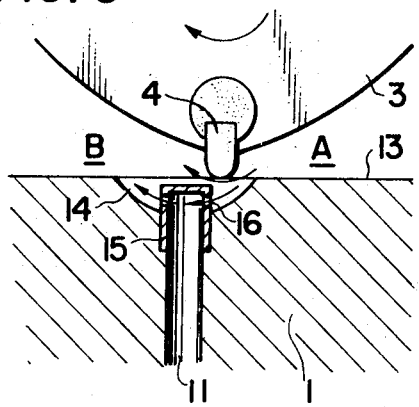

FIG. 4 shows the nozzle portion wherein a sleeve 15 is mounted on the open end of the nozzle 9 so as to project into the recess 14, and FIG. 5 shows the nozzle portion wherein a sleeve 15 with a cover provided with flow ports 16 formed at the end of the peripheral wall thereof is mounted on the open nozzle end. Since the nozzles shown in FIGS. 4 and 5 have the sleeves 15 projecting from the bottom surface of the recess 14, the loading of the openings with sludge due to the sliding of the apex seals 4 is more difficult than that shown in FIG 3.

The recess 14 may be selected of any suitable depth and shape such as square or rectangular, and its disposition may also be in either the center housing or the side housings.

Figure 6:
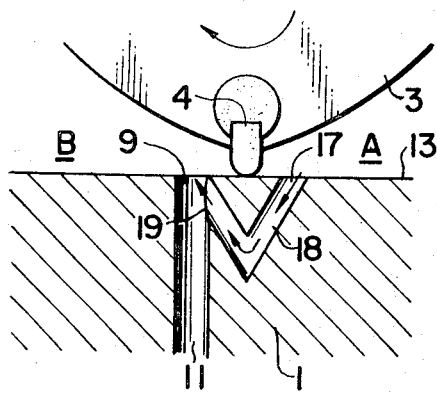

In the embodiment shown in FIG. 6, the opening of the secondary air supply nozzle or outlet nozzle 9 for the combustion gas, opening on the sliding surface 13 of the center housing 1, is disposed in the low pressure operating chamber such as, for example, exhausting stroke chamber B. A high pressure inlet port 17 is formed in the adjacent high pressure operating chamber such as, for example, expanding stroke chamber A, and is connected with the high pressure gas outlet 19 through a high pressure gas flow passage 18, and the outlet 19 is obliquely connected upwardly with the secondary air supply nozzle 9.

Figure 7:
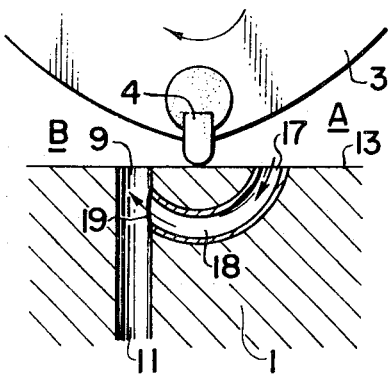

In FIG. 7, the high pressure gas passage 18 is formed by the method of cutting to remove the unnecessary projecting portion after casting the bent pipe into the housing in advance instead of perforating the housing mechanically as shown in FIG. 6.

Thus, with the rotation of the piston 3, when the apex seal 4 is disposed between the high pressure inlet 17 and the high pressure outlet 19, the high pressure operating chamber A and the low pressure operating chamber B are connected through the high pressure gas flow passage 18. Therefore, the sludge tending to accumulate near the opening of the secondary air supply nozzle or the outlet nozzle for the combustion gas is removed by the ejecting force of the high pressure gas, so as to prevent the loading of the nozzle opening with the sludge.

The disposition of the high pressure gas flow passage may be provided in either the side housings or the center housing in the range for performing the aforementioned operation.

Figure 8:
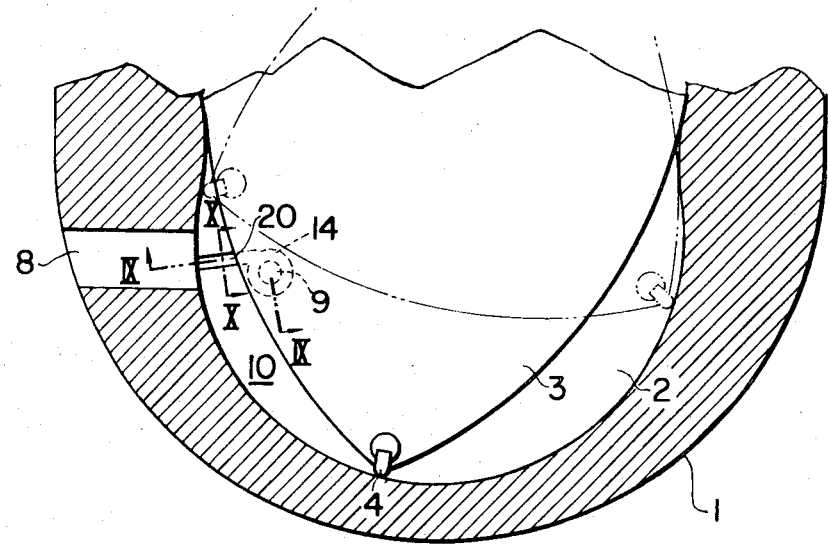
FIG. 8 is a partial sectional view of a rotary piston engine in which a nozzle is disposed at the side housing.
Figure 9:
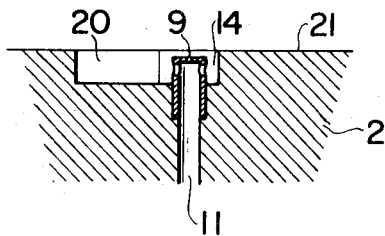
FIGS. 9 and 10 are sectional views taken along the lines IX—IX and X—X, respectively in FIG. 8.
Figure 10:
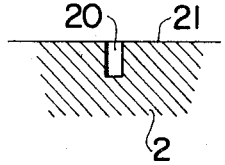

The embodiments shown in FIGS. 8 to 10 are formed by disposing the nozzle structure shown in FIG. 5 on the side housing 2 so as to connect the recess 14 with the exhaust port 8 through the groove 20. In this case, the groove 20 is so formed in width that the corner seals, side seals or apex seals 4 may not fall therein. In this embodiment, the recess 14 is provided on the sliding surface 21 of the side housing 2, the nozzle 9 opens into the recess 14, and the recess 14 is connected with the exhaust port 8 or in the neighborhood of the exhaust port 8 through the groove 20. Accordingly the supply of the secondary air or removal of the combustion gas may be continued until the exhausting stroke is completed, and the accumulation of sludge is greatly reduced so as to prevent the loading of the nozzle 9 with the sludge.

Figure 11:
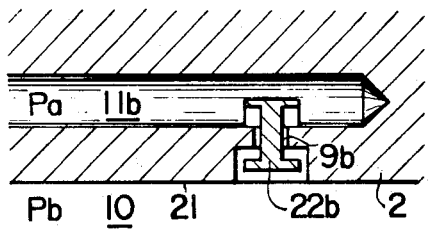
FIGS. 11 to 13 are partial enlarged views of other embodiments of nozzles for supplying secondary air on the inner surface of the side housing which has a floating member.
Figure 12:
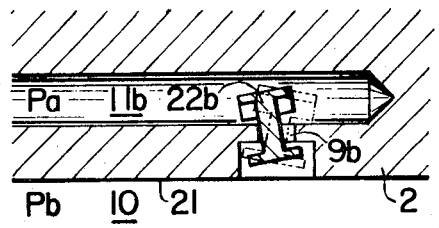
Figure 13:
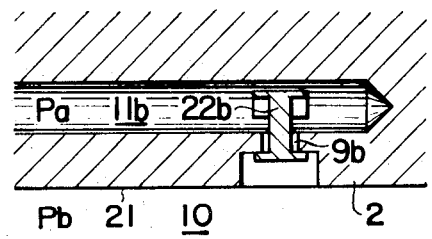

In the embodiment shown in FIGS. 11 to 13, the nozzle 9 for supplying the secondary air into the exhausting stroke chamber 10 is provided in the side housing 2. A floating valve 22b is movable provided in the nozzle end 9b connected with the secondary air conduit 11b so as not to move into the operating chamber 10, and is so constructed as to open or close the nozzle 9b by the difference between the secondary air pressure Pa and the inner pressure Pb of the operating chamber 10.

In operation of the embodiment shown in FIGS. 11–13, the secondary air pressurized by the air pump (not shown) is introduced into the nozzle 9b through the conduit 11b, but at this time the following three states are provided by the pressure difference before and after the nozzle 9b, that is, the difference between the secondary air pressure Pa of the conduit 11b and the inner pressure Pb in the operating chamber 10 containing the nozzle 9b:

1. As shown in FIG. 11 on the condition of Pa > Pb, the floating valve 22b is urged toward the operating chamber 10 side by the pressure of the secondary air so that the nozzle 9b is opened and the secondary air cools the floating valve as it moves into the operating chamber.

2. On the condition of Pa = Pa as shown in FIG. 12, since the stream of the secondary air is stopped, the floating valve 22b freely moves in the nozzle 9b to prevent the sludge from tending to adhere onto the wall surface or to remove the sludge adhered onto the wall surface.

3. On the condition of Pa < Pb as shown in FIG. 13, the floating valve 22b is urged toward the conduit 11b by the pressure of the operating chamber 10 to close the nozzle 9b and, accordingly, prevents the operating gas of high temperature and pressure from inversely flowing into the conduit 11b.

In accordance with the foregoing description, the loading of the nozzle 9b with sludge or the narrowing thereof is prevented by the provision of the floating valve 22b to the nozzle 9b so as to stably supply the secondary air so as to enable the reducing of the detrimental unburned gas in the exhaust gas.

Figure 14:
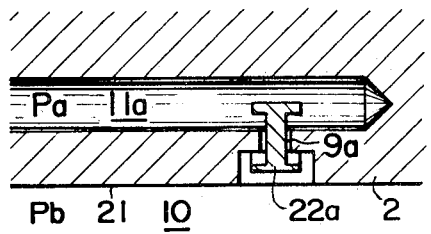
FIG. 14 is a view similar to FIG. 11 of the outlet nozzle for the combustion gas.

In the embodiment shown in FIG. 14, the same structure shown in FIGS. 11 to 13 is applied to the exhaust gas outlet nozzle of the combustion gas of the exhaust gas recirculating system. In this case, when the pressure Pa in the conduit 11a connected with the carburetor is smaller than the pressure Pb in the operating chamber 10, it allows the combustion gas to pass. When the pressure Pa is larger than the pressure Pb, it prevents the reverse flow in the structure, and the floating member 22a movably provided in the nozzle 9a is the structure shown in FIG. 14. Thus, the adhering of the sludge is prevented similarly to the case shown in FIGS. 11 to 13.

Figure 15:
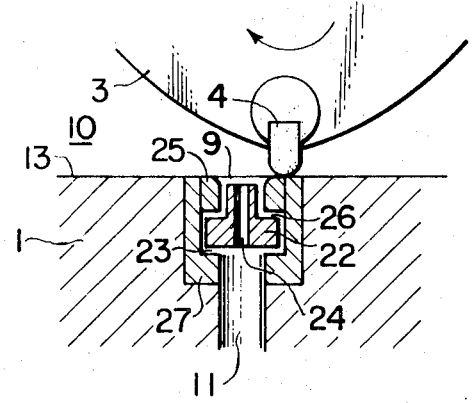
FIGS. 15 to 17 are partial sectional views of the embodiments of the nozzle structure provided with a floating member moved by the pressure to the nozzle disposed at the center housing of the rotary piston engine.
Figure 16:
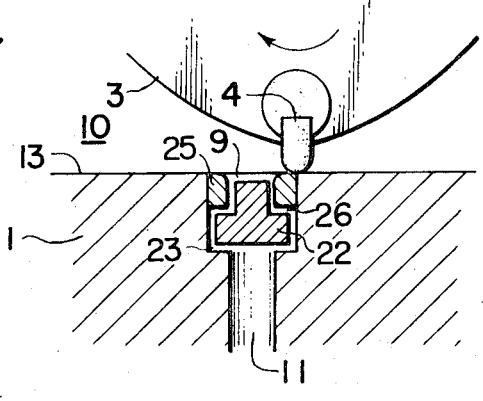
Figure 17:
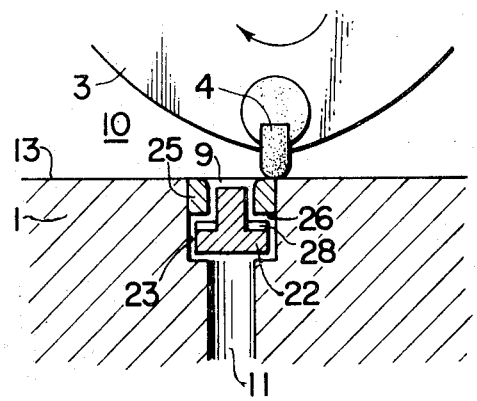

FIGS. 15 to 17 show the embodiments wherein the nozzle 9 has a floating member 22 for floating in response to the difference of the pressure in the conduit 11 and the pressure in the exhausting stroke chamber 10.

In the embodiment shown in FIG. 15, an opening 23 is provided on the sliding surface 13 of the center housing 1 forming the combustion chamber 10 during the exhausting stroke, a floating member 22 of projecting shape in section having a hole 24 through the center thereof is movably provided, and a ring 25 for preventing the floating member 22 from discharging into the end of the opening 23 is engaged therewith. Thus, a passage 26 is formed between the outer wall of the floating member 22 and the inner wall of the opening 23. The floating member is so constructed as to be movable up and down and laterally in the passage 26, at the same time the lower side of the opening 23 is connected to the conduit 11. Numeral 27 shows a reinforcing wall.

According to the embodiment shown in FIG. 15, since the nozzle 9 is opened in the combustion chamber 10 during the exhausing stroke, the floating member 22 vibrates upwardly and downwardly as well as laterally by the pressure change of the pulsating exhausting gas, so that the sludge tending to accumulate in the hole 24, opening 23 and passage 26 is mechanically removed by the vibration so as to positively prevent sludge from loading thereat.

In the embodiment shown in FIG. 16, as compared with that shown in FIG. 15, the difference is such that a hole 24 is not formed through the floating member 22, but when such structure is applied to the secondary air supply system, the floating member 22 is depressed down by the high pressure gas until the exhaust port is opened so as to prevent the combustion gas of high pressure from inversely flowing into the secondary air supply passage. This action mechanically removes any accumulated sludge by the valve movement.

In the embodiment shown in FIG. 17, a slit 28 is formed on the upper surface of the flange of the floating member 22 or on the lower surface of the ring 25 instead of the hole 24 in the embodiment shown in FIG. 15. When this embodiment is applied to the secondary air supply system, the combustion gas of high pressure is prevented from inversely flowing into the secondary air supply passage at the same time, even if the floating member 22 is urged toward the ring 25 by the secondary air pressure, the secondary air being continuously supplied through the slit 28 as its advantage. The disposition of the floating member may not only be at the center housing, but be at the side housings within the range for performing the aforementioned operation.

The embodiments shown in FIGS. 18 to 21 are other examples of the case wherein the nozzle structure of this invention is applied to a two cylinder rotary piston engine. These embodiments are particularly preferable in the secondary air supply system and, accordingly, are shown and described with respect to the secondary air supply system.

Figure 18:
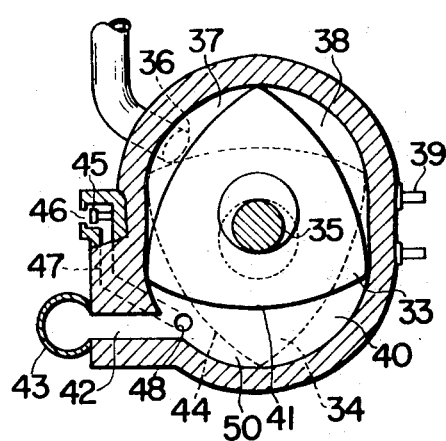
FIG. 18 is a front elevational view in section of an embodiment with the secondary air supply device of the rotary piston engine having two cylinders where the nozzle structure has a floating member.
Figure 19:
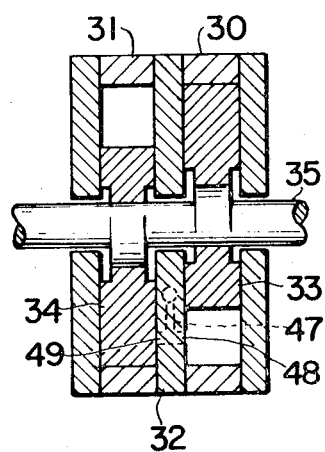
FIG. 19 is a side elevational view of the embodiment shown in FIG. 18.
Figure 20:
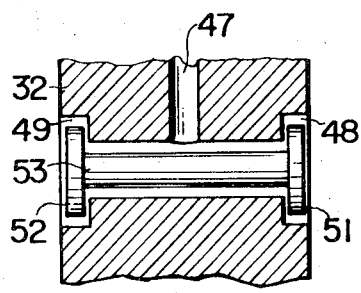
FIG. 20 is an enlarged sectional view of the essential part of the embodiment shown in FIG. 18.

In the embodiments shown in FIGS. 18 to 20, the engines 30 and 31 aare integrally assembled adjacent to the intermediate housing 32 as a common side housing, and the respective pistons 33 and 34 are mounted on a common eccentric shaft 35 in a phase difference of 180 degrees. When the piston 33 of the engine 30 is disposed as designated by a solid line in FIG. 18, the piston 34 of the engine 31 is disposed as designated by a dotted line in FIG. 18. In the engine 30, the mixture gas is introduced from air intake port 36 to air intake chamber 37, is compressed in the compression chamber 38, and then the compressed mixture gas is ignited by the ignition plug 39 to be burned, and in the operation chamber 40 of the state of the piston 33 as shown in the drawing, the lead side of the flank 41 of the piston 33 is opened to the exhasut port 42, and the combustion gas is exhausted into the thermal reactor 43. Whereupon, the engine 31, the trailing side of the flank 44 of the piston 34 is opened to the exhaust port 42. The secondary air is introduced from an air pump (not shown) through the secondary air inlet 46 having a check valve 45, and is poured into the respective operating chambers 40 and 50 of the engines 30 and 31, respectively, by the secondary air supply nozzles 48 and 49, repectively, branched near the exhaust port 42 through the secondary air pouring passage 47 formed in the intermediate housing 32.

Figure 21:
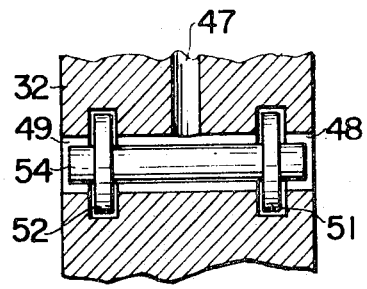
FIG. 21 is a view similar to FIG. 20 showing another modification.

As shown in FIG. 20, the secondary air supply nozzles 48 and 49 have an integral floating member 53 having collars 51 and 52 at both ends thereof and passing through the intermediate housing 32 and floating in response to the pressure difference between the operating chambers of both cylinders in the secondary air supply nozzles 48 and 49 so as to effectively remove the sludge by the movement of the floating member 53. As the alternative of the floating member 53 in FIG. 20, if a floating member 54 of the shape shown in FIG. 21 is used, the size of the hole of the intermediate housing 32 on the wall thereof becomes small so that the piston may smoothly rotate without engaging with the side sealing of the piston so as to remove the adhered sludge.

What is claimed is:

1. In a rotary piston engine comprising: a casing having a center housing and side housings disposed on repective sides of said center housing, a rotary piston rotatably mounted in said casing and having at least one apex, an apex seal disposed in said piston apex, said apex seal slidably and sealably contacting said center housing inner surface, said casing and said rotary piston defining in order, intake, compression, combustion and exhaust chambers therebetween, an intake port within said casing opening up into said intake chamber for supplying primary air to said intake chamber, an exhaust port within said casing opening up into said exhaust chamber for exhausting combustion gas therefrom, and an auxiliary nozzle within said casing opening up into said exhaust chamber for supplying secondary air to said exhaust chamber, or for removal of exhaust gas therefrom for recirculation, the improvement comprising: means for preventing sludge accumulation about said auxiliary nozzle.

2. A rotary piston engine as set forth in claim 1, wherein said sludge accumulation prevention means is provided in the inner surface of said casing for releasing the high pressure gas from the high pressure chamber to the low pressure chamber of two adjacent chambers of the engine in response to the pressure difference between said chambers when the apex seal passes over said sludge accumulation prevention means, thereby removing the sludge accumulated on said nozzle owing to the movement of said apex seal.

3. A rotary piston engine as set forth in claim 2, wherein said means comprises a flow passage having an inlet and outlet provided in said casing and the open end of said nozzle is connected to said flow passage.

4. A rotary piston engine as set forth in claim 3, wherein said outlet of the flow passage is obliquely connected upwardly to the open end of said nozzle.

5. A rotary piston engine as set forth in claim 3, wherein said flow passage and said nozzle are provided in the center housing of said casing.

6. A rotary piston engine as set forth in claim 1, wherein said means comprises a floating member mounted within said nozzle and adapted to float longitudinally and laterally to remove sludge adhered to said nozzle.

7. A rotary piston engine as set forth in claim 6, wherein said nozzle is connected to an air source for supplying secondary air through a conduit into the exhausting stroke chamber, said floating member being adapted to connect the conduit with the chamber when the pressure in said conduit is larger than the pressure of said chamber, and to shut off communication between the conduit and the chamber when the pressure in said conduit is smaller than the pressure in said chamber.

8. A rotary piston engine as set forth in claim 6, wherein said nozzle is connected to an intake system to recirculate combustion gas to the intake mixture through the conduit said floating member shutting off the communication of the conduit with the chamber when the pressure in said conduit is larger than the pressure of said chamber, and connecting the conduit with the chamber when the pressure of said conduit is smaller than the pressure of said chamber.

9. A rotary piston engine as set forth in claim 6, wherein said floating member comprises a member of rivet shape engaged with said nozzle.

10. A rotary piston engine as set forth in claim 6, wherein said floating member is movably disposed at the open end of said nozzle, and a ring for preventing the floating member from being removed from the nozzle is provided at the end of said open end of said nozzle.

11. A rotary piston engine as set forth in claim 6, wherein said engine has two center housings and an intermediate housing disposed between said two center housings to form two adjacent cavities, an intake port and an exhaust port opening into the respective cavities, a conduit provided in said intermediate housing, each nozzle being branched from said conduit and opening at said intermediate housing into the respective cavities, and said floating member is composed of a single member in common with each nozzle.

12. A rotary piston engine as set forth in claim 11, wherein said each nozzle forms a hole penetrating said intermediate housing in the axial direction, and said floating member is movably mounted within said hole.

13. A rotary piston engine as set forth in claim 11, wherein said conduit is connected to an air source, and said floating member has collars at both ends thereof, said floating member being adapted to float longitudinally and laterally by the pressure in the exhausting stroke chamber of the adjacent cavities.

14. A rotary piston engine as set forth in claim 10, wherein said floating member has a hole through the center thereof so as to connect the conduit through the hole to the operating chamber.

15. A rotary piston engine as set forth in claim 10, wherein said nozzle is connected through the conduit to the secondary air supply source, and a floating member has a slit at the contacting surface with said ring for allowing the secondary air to flow into the chamber when the pressure in the conduit is larger than the pressure in the chamber.

16. A rotary piston engine as set forth in claim 2, wherein said means comprises a recess provided on the inner surface of said casing, and the open end of said nozzle is disposed within said recess.

17. A rotary piston engine as set forth in claim 16, wherein said recess and said nozzle is provided in the center housing of said casing.

18. A rotary piston engine as set forth in claim 16, wherein said recess is provided in the side housing of said casing, and a groove for connecting said recess to the exhaust port is provided.

19. A rotary piston engine as set forth in claim 16, wherein said nozzle includes a sleeve at its open end to project into said recess.

20. A rotary piston engine as set forth in claim 19, wherein said nozzle comprises a sleeve at its open end to project into said recess and said sleeve is closed at the outer end thereof, and includes at least one flow opening in its peripheral wall.

* * * * *